(No Model.)
W. BÜTTNER.
APPARATUS FOR EXTRACTING FAT FROM BONES.
No. 360,996. Patented Apr. 12, 1887.
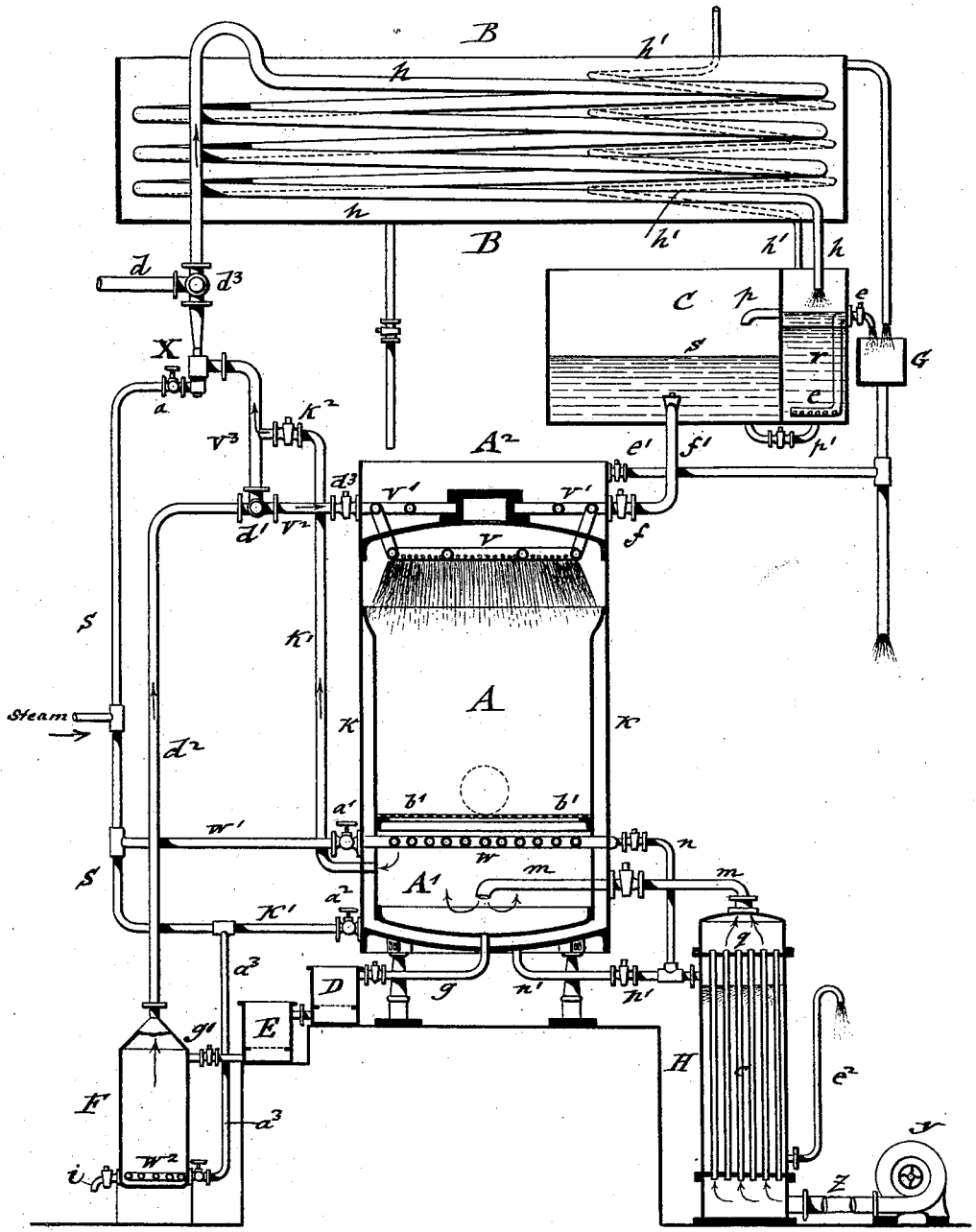
WITNESSES
INVENTOR
Wilhelm Büttner
By his Attorneys

UNITED STATES PATENT OFFICE.

WILHELM BÜTTNER, OF GUMMERSBACH, PRUSSIA, GERMANY.

APPARATUS FOR EXTRACTING FAT FROM BONES.

SPECIFICATION forming part of Letters Patent No. 360,996, dated April 12, 1887.

Application filed November 13, 1885. Serial No. 182,673. (No model.)

*To all whom it may concern:*

Be it known that I, WILHELM BÜTTNER, of Gummersbach, in the Kingdom of Prussia and Empire of Germany, have invented certain new and useful Improvements in Apparatus for Extracting Fats from Bones, of which the following is a specification.

This invention has reference to an improved apparatus for extracting fat from bones, wool, and other substances by means of volatile solvents, which can be separated afterward by distillation from the fats, the apparatus being further designed for purifying the elutriated fat, extracting the glue from the bones, evaporating the glue to greater consistence, and for drying the residue contained in the extractor.

The invention consists of an apparatus for extracting fat from bones and other substances in which a steam-jacketed extractor is connected with a reservoir for the volatile solvent, an exhauster, a condenser, filtering-vessel, a grease and glue collector, and other parts, as will be more fully described hereinafter, and finally pointed out in the claims.

The accompanying drawing represents a vertical longitudinal section of my improved apparatus for extracting fatty matter from bones and other substances.

A in the drawing represents an extractor, which is provided with a steam-jacket, $k$. The extractor A is hermetically closed at the top after the same has been filled with bones or other material to be elutriated, the bones resting on a perforated bottom, $b'$. Below the bottom $b'$ is arranged a steam-coil, $w$, which is connected by a pipe, $w'$, having a stop-cock, $a'$, with the steam-supply pipe S. The jacket $k$ is also connected, by a pipe, $k'$, having a stop-cock, $a^2$, with the steam-supply pipe S, the water of condensation being conducted from the coil $w$ and the jacket $k$, by valved pipes $n$ $n'$, to a cylindrical vessel, H, from which the water of condensation is conducted off by a goose-neck pipe, $e^2$. A fan or blower, $y$, is connected to the lower part of the cylindrical vessel H by a pipe, $z$, the air being forced into the vessel H and conducted through vertical pipes $c\,c$ of the same into the chamber $q$ at the upper part of the vessel H, so as to be heated up in its passage through the pipes $c\,c$. The air is then conducted through the valved pipe $m$ into the lower part, A', of the extractor A, where its temperature is raised by contact with the coil $w$ and the interior surface of the extractor A, and then drawn through the bones by an exhauster, X, passing through a perforated coil, $v$, located at the upper part of the extractor A, coil $v'$ at the outside of the same, connecting-pipe $v^2$, having a three-way cock, $d'$, pipe $v^3$, exhauster X, three-way cock $d^3$, and pipe $d$ to the atmosphere.

The object of passing hot air through the bones is to heat the same and to evaporate and remove the moisture contained in the same. As soon as this is accomplished the stop-cock of the pipe $m$ is closed, and by the exhauster X the moist air in the extractor A exhausted until a vacuum is obtained in the same. Above the extractor A is arranged a reservoir, C, for the benzine or other volatile solvent employed for elutriating the bones, which reservoir is divided by a transverse partition into the chambers $r$ and $s$. The chamber $s$ is connected by a valved pipe, $f'$, having stop-cock $f^2$, with the exterior condensing-coil, $v'$, which latter is located in a cylindrical extension, A², at the top of the extractor A, said extension being filled with water for cooling the coil $v'$.

By establishing the connection between the reservoir C and the extractor A the solvent is conducted through the exterior coil, $v'$, and the interior perforated coil, $v$, to the interior of the extractor, and dropped in the form of a fine spray on the heated bones up to their saturation-point, while the surplus is conducted into the space A' below the coil $w$. Steam is next admitted into the jacket $k$, whereby the solvent in the extractor is evaporated. To prevent the escape of the vapors at the top of the apparatus, the extension A² is supplied with cold water, so that the vapors passing into the coil $v'$ are condensed and returned in liquid state through the coil $v$.

The bottom of the extractor A is connected by a valved pipe, $g$, to the filtering-vessels D and E, of which the vessel E is connected by a valved pipe, $g'$, with a grease and glue collector, F, said vessels D, E, and F being arranged at different levels below each other. The collecting-vessel F is provided at its lower part with a steam-coil, $w^2$, which is connected by a valved pipe, $a^3$, with the steam-supply pipe S. By admitting steam to the coil $w'$ the solvent is evaporated in the vessel F and conducted back to the extractor by the pipe $d^2$, three-way cock $d'$, and coils $v'$ $v$, as shown by arrows in the drawing. A direct pipe, $k'$, having a stop-cock, $k^2$, connects the lower part of the extractor A with the exhauster X, so as to permit the direct sucking off of the volatilized solvent from the lower part of the extractor.

When the vapors from the collecting-vessel F are to be condensed, they are conducted to the coil $h$ of the condenser B, that is located above the benzine-reservoir C. The coil $h$ terminates in the chamber $r$ of the reservoir C and discharges the condensed water and solvent into said chambers, where the water settles by its greater specific gravity at the bottom and is conducted off through the perforated goose-neck pipe $e$ to the outside. The solvent, which is of lighter specific gravity, passes through an overflow-pipe, $p$, into the chamber $s$ of the reservoir C, and is then again conveyed to the extractor. Any smell that is carried along by the air is conducted from the chamber $r$ through the coil $h'$ to the atmosphere, while any vapors contained in the air are condensed in the coil $h'$ and returned to the chamber $r$. By continuing the elutriation of the fat from the bones for from two to three hours, the extraction of the same is completed. The next step is to evaporate the solvent contained in the bones in the extractor, which is accomplished by opening the stop-cocks $a'$, $a^2$, and $d^3$, and admitting live steam into the coils $w$ and $w'$ and jacket $k$, whereby the solvent is evaporated and exhausted from the vessels A and F and condensed in the coil $h$, and returned to the chamber $s$ of the reservoir C, so as to be ready for use for the next charge. After the solvent has been regained in this manner, the fat is treated for some time *in vacuo* in the vessel F, so as to expel the stench, after which it is drawn off through the faucet $i$ of the vessel F.

After the fat has been drawn off the bones in the extractor A are saturated with water and steamed for about ten minutes, after which the steam is drawn off by the exhauster X through the pipes $g$ $g'$ $d^2$, three-way cock $d'$, and pipe $d$ to the outside. This causes a strong current from the upper to the lower part of the extractor, which carries the dissolved glue in the bones through the filtering substances in the vessels D and E to the vessel F, in which the glue is collected. By repeating these operations two or three times the glue is perfectly extracted from the bones and collected in the vessel F. The valves $a'$ and $a^2$ are next opened, so that the moisture in the bones is evaporated by the heat, while the glue in the vessel F begins to boil by admitting steam to the coil $w^2$. The exhauster is now operated again, so as to draw off the moisture evaporated from the bones and glue in the extractor A and vessel F, the boiling being continued *in vacuo* until the solution of glue is evaporated to the required degree of consistence. When the solution of glue has been drawn off, the blower $y$ is operated for a short time and warm air forced through the bones, by which the moisture still contained in the same is evaporated and drawn off by the exhauster X and conveyed by the pipe $d$ to the outside, the bones being thus dried sufficiently to be ground up without requiring to be dried in a separate kiln. To prevent that, both the fat and glue are passed through the same filtering material and through the same collecting-vessel. It is preferable to use two sets of vessels D E and F, especially when a clear glue of light color is desired to be obtained, so that the fat passes through one battery of vessels, while the glue passes through and is collected in the other battery.

The advantages of my improved apparatus are, first, the bones and other substances are heated and the moisture contained therein evaporated before elutriation, whereby the solvent saturates the bones in a quicker and more perfect degree than when they are in a moist state; secondly, as no glue or other substances are extracted during elutriation, the bone-dust is richer in nitrogen; thirdly, the solvent is conducted from the top downward through the substances to be elutriated, so as to wash out the fat more completely than when the solvent is evaporated at the lower part and passed through the bones in a direction opposite to the downwardly-moving fat; fourthly, the fat and glue are filtered and freed of stench by being treated *in vacuo*; and fifthly, the bones, after elutriation and after the extraction of the glue, are dried directly in the extractor by the admission of warm air and the exhaustion of the moist air, while at the same time the solution of glue is evaporated to the proper consistence.

Having thus described my invention, I claim as new and desire to secure by Letters Patent—

1. The combination of a steam-jacketed extractor provided with a perforated false bottom, a steam-coil within said extractor below the false bottom, an air-heater, a valved pipe connecting the air-heater with the extractor below the steam-coil, and a blower for forcing air through the air-heater into the extractor, substantially as described.

2. The combination of a steam-jacketed extractor provided with a perforated false bottom, a steam-coil within the extractor below the false bottom, an air-heater, a valved pipe connecting the air-heater with the extractor below the steam-coil, a blower for forcing air through the air-heater into the extractor, a discharge-pipe connected with the extractor, and an exhauster on the discharge-pipe, substantially as described.

3. The combination of a steam-jacketed extractor provided with a perforated false bottom, a steam-coil within the extractor below the false bottom, an air-heater, a valved pipe connecting the air-heater with the extractor below the steam-coil, a blower for forcing air through the air-heater into the extractor, and a pipe connecting the steam-jacket of the extractor with the air-heater for utilizing the water of condensation for heating the air-heater, substantially as described.

4. The combination of a steam-jacketed extractor provided with a perforated false bottom, a steam-coil within the extractor below the false bottom, a perforated coil within the extractor near the top thereof, an air-heater connected with the extractor below the steam-coil, a blower for forcing the air heated by the heater into the extractor, and a valved exhaust-pipe connected with the perforated coil, substantially as described.

5. The combination of a steam-jacketed extractor provided with a perforated false bottom, a steam-coil within the extractor below the false bottom, a perforated coil within the extractor near the top thereof, an air-heater connected with the extractor below the steam-coil, a blower for forcing the air heated by the heater into the extractor, a valved exhaust-pipe connected with the perforated coil, a reservoir for a volatile solvent, and a valved pipe connecting the reservoir with the perforated coil within the extractor, whereby said coil may be used alternately for the discharge of air and the admission of the solvent, substantially as described.

6. The combination of a jacketed extractor provided with a water-tank over its top, a reservoir for a volatile solvent, a perforated coil within the extractor near its top, a coil within the water-tank, pipes connecting said coils, and a valved pipe connecting the reservoir with the coil within the water-tank, substantially as described.

7. The combination of an extractor provided with a perforated false bottom, an air-heater, a valved pipe connecting the air-heater with the extractor below the false bottom, a perforated coil near the top of the extractor, a valved exhaust-pipe connected with the perforated coil, an exhauster connected with the valved exhaust-pipe, a reservoir for volatile solvent, a valved pipe connecting the reservoir with the perforated coil within the extractor, filtering-vessels located at different levels below the extractor, a valved pipe connecting said filtering-vessels with the extractor, a collecting-vessel connected with the lower filtering-vessel, a steam-coil within the collecting-vessel, a pipe connecting the collecting-vessel with the extractor, a condenser above the reservoir for the volatile solvent, a pipe connecting the exhauster with the condenser, and a pipe connecting the condenser with the reservoir, whereby the several operations may be performed successively, substantially as set forth.

8. The combination of an extractor, a reservoir for a volatile solvent, a perforated coil within the extractor, a pipe connecting the perforated coil with the reservoir, and a condenser connected with the extractor and reservoir, said reservoir being divided by a transverse partition into a solvent-chamber and a separating-chamber, the separating-chamber being provided with an elevated discharge-pipe extending near the bottom of its chamber, and a connecting-pipe between the chambers at a point above the level of the discharge-pipe, substantially as described.

In testimony that I claim the foregoing as my invention I have signed my name in presence of two subscribing witnesses.

WILHELM BÜTTNER.

Witnesses:
J. SCHMITZ,
E. MONYMURT.